Feb. 28, 1933. T. A. MASTER ET AL 1,899,517
ICE GRIP NONSKID
Filed May 14, 1931
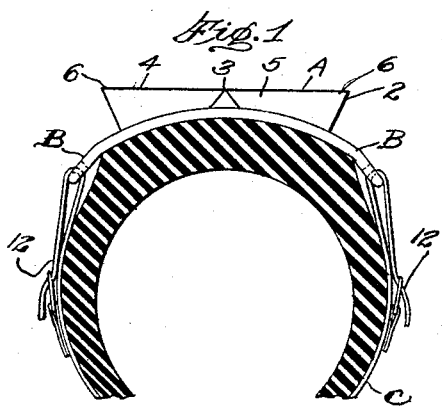

Patented Feb. 28, 1933

1,899,517

UNITED STATES PATENT OFFICE

THOMAS ANTHONY MASTER, OF SOUTH OTSELIC, AND LOUIS D'ANGELO, OF BINGHAMTON, NEW YORK

ICE GRIP NONSKID

Application filed May 14, 1931. Serial No. 537,372.

Our invention relates to an improvement in ice grip, non-skid device for automobiles and other vehicles, and it has for its object to provide an adjustably mounted easily attached device for automobile tires which overcomes skidding and affords a safe grip when ascending a grade or descending a grade on an icy surface.

With these objects in view our invention consists in certain novel features of construction and arrangement of parts as will be hereinafter fully described and pointed out in the claims. Reference being had to the accompanying drawing in which:

Fig. 1 is a side view of our device as applied to a tire.

Fig. 2 is a plan view of our device as applied to tire chains on a tire.

Fig. 3 is a cross section of an end view of our device.

Fig. 4 is a side view of our device when combined in its application to the tire in connection with the tire chain.

The same reference characters denote like parts in each of the several figures of the drawings.

In carrying out our invention, we provide the body member A, mounted longitudinally on a transverse strip formation B, arcuate in cross section. The outer ends of A are inwardly projected or undercut as at 2, and the outer surface has the horizontal cross line 3, with the longitudinal lines 4 narrowing at the interior neck 5, and having the wedge shaped outline at the end surface 6.

As a further part of our device in the outer end of strap B we have the cross slot 7.

As a further part of our device we provide the strip B, with the openings 8 therein adapted to receive a chain link therethrough. Mounted thru the cross slot 7 we have a strap formation C, which may be of metal or other material.

As a further part of our device there is the tire chain D, composed of the usual links 9.

As a further part of our device we have mounted in the openings 8 the connecting chain links 10, and its outer ends connect at the side chains 9 at any convenient manner at the point 11.

As a further part of our device the strap C may be of leather mounting a buckle 12, as shown in Fig. 1, and which strap C passes around the outer surface of the tire and holds the device in place. The side chains D are mounted in any convenient manner along the auto tire, and held in place by the connecting links 10, attached to the body B.

In another form of our device, the body A and the support B may be adapted in any convenient manner and positioned spaced apart along a tire chain, the object of the strap C is to hold the body A in firm connection with the tire surface. By the use of the leather strap and buckle attachment the body A and the support B can be more closely adjusted and firmly adjusted to the tire surface while at the same time it has the full strength of the chain support in mounting it in position.

Having thus described our invention, what we claim as new and for which we desire Letters Patent is as follows:

An anti-skid device for vehicle wheels comprising in combination with side chains of a plurality of transverse arcuate strips adapted to be connected to the side chains, said strips being provided at either end with a transverse slot and perforations, a body portion mounted on each transverse strip, said body portion being cruciform with its outer edges undercut and its outer surface having intersecting ridges, the ends of the body portion being within the limits of the dimensions of the strip means for connecting the ends of the strip with the side chains and means disposed in the transverse slots of the strip for embracing the felloe.

In testimony whereof we have affixed our signatures.

THOMAS ANTHONY MASTER.
LOUIS D'ANGELO.